(12) United States Patent
Christian et al.

(10) Patent No.: US 10,487,462 B2
(45) Date of Patent: Nov. 26, 2019

(54) METHOD AND APPARATUS FOR SPREADING CHIPS ON ROADWAY

(71) Applicant: Roadtec, Inc., Chattanooga, TN (US)

(72) Inventors: Richard Christian, Chattanooga, TN (US); Raymond Clark Baker, IV, Chattanooga, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 16/137,716

(22) Filed: Sep. 21, 2018

(65) Prior Publication Data

US 2019/0127929 A1 May 2, 2019

Related U.S. Application Data

(60) Provisional application No. 62/580,766, filed on Nov. 2, 2017.

(51) Int. Cl.
| | |
|---|---|
| *E01C 19/21* | (2006.01) |
| *E01C 23/06* | (2006.01) |
| *B60P 1/04* | (2006.01) |
| *B60P 3/22* | (2006.01) |
| *E01C 19/17* | (2006.01) |
| *E01C 19/20* | (2006.01) |
| *E01C 11/00* | (2006.01) |

(52) U.S. Cl.
CPC .............. *E01C 23/06* (2013.01); *B60P 1/04* (2013.01); *B60P 3/2245* (2013.01); *E01C 11/005* (2013.01); *E01C 19/174* (2013.01); *E01C 19/20* (2013.01); *E01C 19/21* (2013.01); *E01C 2019/207* (2013.01)

(58) Field of Classification Search
CPC .......... E01C 19/00; E01C 19/12; E01C 19/15; E01C 19/16; E01C 19/17; E01C 19/20; E01C 19/21; E01C 19/45; E01C 19/46
USPC .......................... 404/75, 101, 108, 110, 111
See application file for complete search history.

(56) References Cited

U.S. PATENT DOCUMENTS

| | | | | |
|---|---|---|---|---|
| 3,100,425 | A * | 8/1963 | Cartwright ............ | E01C 19/174 239/100 |
| 3,483,804 | A * | 12/1969 | Nolan ..................... | E01C 19/21 239/130 |
| 4,226,552 | A * | 10/1980 | Moench .............. | E01C 19/1036 366/1 |
| 6,802,464 | B2 * | 10/2004 | Marconnet .............. | E01C 19/21 239/159 |

(Continued)

*Primary Examiner* — Gary S Hartmann
(74) *Attorney, Agent, or Firm* — Chambliss, Bahner & Stophel, P.C.

(57) ABSTRACT

A modified chip spreader is adapted to be used in a chip sealing train including a chip supply dump truck and an asphalt composition supply truck. The modified chip spreader is a self-propelled vehicle that has a receiving hopper on its front end for receiving stone chips from the chip supply dump truck, a spreader assembly on its rear end and a conveyor assembly for conveying the stone chips from the receiving hopper to the spreader assembly. The modified chip spreader also includes a spray assembly that is in fluid communication with an outlet line from the asphalt composition supply truck, which spray assembly is adapted to dispense an asphalt composition onto the surface of a roadway in front of the spreader assembly. The spreader assembly dispenses the stone chips onto the newly applied asphalt composition on the surface of the roadway.

12 Claims, 3 Drawing Sheets

(56) References Cited

U.S. PATENT DOCUMENTS

| | | | |
|---|---|---|---|
| 6,805,516 B2 * | 10/2004 | Barnat | E01C 19/21 404/101 |
| 7,798,744 B2 * | 9/2010 | Larson | E01C 19/21 404/101 |
| 9,863,102 B2 * | 1/2018 | Fickeisen | E01C 19/48 |
| 9,956,917 B1 * | 5/2018 | Neisen | B60R 3/02 |
| 10,246,835 B1 * | 4/2019 | Christian | E01C 23/06 |

* cited by examiner

METHOD AND APPARATUS FOR SPREADING CHIPS ON ROADWAY

CROSS-REFERENCE TO RELATED APPLICATION

This application claims the benefit of U.S. Provisional Patent Application No. 62/580,766 which was filed on Nov. 2, 2017.

FIELD OF THE INVENTION

The invention relates generally to a method and apparatus for carrying out a chip sealing operation on a roadway. More particularly, the invention relates to a method and arrangement of equipment that allows for chip sealing to be carried out without requiring that the chip supply dump truck travel backwards.

BACKGROUND AND DESCRIPTION OF THE PRIOR ART

Roadway repair is often accomplished by overlaying the existing pavement (whether of concrete or asphalt paving material) with a new layer (often called a leveling course) of concrete or asphalt paving material. This is an expensive and time-consuming process and is not always necessary. An alternative is to employ a chip sealing process for extending the useful life of the existing roadway. The typical cost of a chip sealing process is 20-25% of the cost of a conventional asphalt overlay. In the chip sealing process, a binder composition including asphalt cement is applied to the surface of the existing roadway, and then a layer of stone chips of high durability and high fracture plane characteristics is spread over the asphalt composition.

A chip seal is designed to seal and protect a pavement from oxidation and weathering by sealing the small cracks in a pavement surface and thereby preventing the intrusion of water into the pavement surface. A chip seal can also be used to address raveling (loss of aggregate), to correct bleeding and flushing problems, to improve skid resistance, and generally to extend the pavement life. Chip seals are not suited for all pavements; the existing structure should be sound with only minor surface defects. Consequently, chip seals are typically applied to pavements that are in relatively good condition with no structural damage. When a chip seal is applied to a pavement in good condition, an additional six to eight years of service may be expected. For more distressed pavements, less service extension can be expected (four to six years on pavements in fair condition and three to four years for pavements in poor condition).

Different types of asphalt cement binder compositions can be used in a chip sealing process. The composition may be applied with or without heating. Asphalt cement binder compositions that are applied without heating include modified and unmodified asphalt cement emulsions. Compositions that are applied hot can include polymer-modified asphalt cements, polymer-modified asphalt cements blended with rubber or crumb rubber, foamed asphalt cements and unmodified asphalt cements. The appropriate binder type is selected based on pavement condition, climate, aggregate properties, and desired service life and cost considerations.

In some conventional chip sealing processes, an emulsion is formed of asphalt cement and about 30% water. This emulsified mixture is then applied to the road using an emulsion supply truck equipped with a spray assembly. As soon as the asphalt cement emulsion meets the road surface, the water in the emulsion begins to evaporate. Consequently, it is necessary to apply a layer of stone chips to the roadway immediately after the application of the asphalt cement emulsion.

However, the chips must be applied to the roadway surface without having the wheels of a vehicle drive on the chip-free emulsion on the roadway surface.

A conventional chip spreader is a self-propelled vehicle that has a hitch assembly on its rear end for coupling it to the rear end of a chip supply dump truck. The chip spreader has a receiving hopper on its rear end that is adapted to receive chips when the dump bed of the supply truck is raised. However, the receiving hopper can only accommodate a portion of the load of the supply truck, so the chip spreader will pull the chip supply dump truck backwards as chips are conveyed from the receiving hopper to a chip spreader assembly on the front end of the chip spreader. The driver of the chip supply dump truck is required to steer the vehicle as it is being pulled backwards by the chip spreader. This can be difficult, especially since the driver is facing away from the direction of travel and his vision in the direction of travel (i.e., that obtained by turning his head around or using mirrors) is partially blocked by the raised dump bed.

It would be desirable if a chip sealing method and apparatus could be developed that would permit chip sealing to be carried out without requiring the chip supply dump truck to travel backwards during the chip sealing process.

ADVANTAGES OF A PREFERRED EMBODIMENT OF THE INVENTION

Among the advantages of a preferred embodiment of the invention is that it provides a chip sealing method and apparatus that permits chip sealing to be carried out without having the wheels of any vehicle drive on the chip-free asphalt composition on the roadway surface and without requiring the chip supply dump truck to travel backwards during the chip sealing process. When a chip sealing operation is carried out according to a preferred embodiment of the invention utilizing a chip sealing train that includes a chip supply dump truck, a modified chip spreader and an asphalt composition supply truck, all three vehicles are able to travel in a forward direction, i.e., with the operator of each vehicle facing forward in the chip spreading direction. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, couplings and the like, such as "attached", "coupled", "connected" and "interconnected", refer to a relationship wherein structures are secured or attached to one another either directly or indirectly through intervening structures, as well as both moveable and rigid attachments or relationships, unless specified herein or clearly indicated by context. The terms "operatively attached" and "operatively connected" describe such an attachment, coupling or connection that allows the pertinent structures to operate as intended by virtue of that relationship. The term "fluid communication" refers to such an attachment, coupling or connection that allows for flow of fluid from one such structure or component to or by means of the other.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "asphalt composition" and similar terms refer to a liquid binder composition including asphalt cement that is used in a chip sealing process. An asphalt composition may comprise modified or unmodified asphalt cement emulsions, foamed asphalt cements, polymer-modified asphalt cements, polymer modified asphalt cements blended with rubber or crumb rubber, and unmodified asphalt cements.

The term "modified chip spreader" refers to a vehicular chip spreading machine which has been modified: (a) by the addition of an asphalt composition flow system including a spray assembly that is mounted in front of the chip spreader to dispense an asphalt composition across the surface of the roadway; and (b) so that the operator of the modified chip spreader may face forward when the modified chip spreader travels in the chip spreading direction (as hereinafter defined). Modified chip spreaders include retrofitted conventional chip spreaders and new machines that are designed to function as described herein.

The term "chip sealing train" refers to a combination of a chip supply dump truck, a modified chip spreader and an asphalt composition supply truck that are used together in a chip sealing process.

The term "chip spreading direction" is the direction of travel of the components of the chip sealing train during the chip sealing process.

The term "in front of" and similar terms refer to an assembly, component or portion of a modified chip spreader or a component of the chip sealing train that is in the chipping direction with respect to a reference point, assembly, component or portion of the modified chip spreader or component of the chip sealing train.

The term "front end" and similar terms, when used with respect to a chip sealing train or a vehicular component of a chip sealing train, refer to a relative location or direction towards the leading end of the chip sealing train or the component thereof as it travels in the chip spreading direction.

The term "behind" and similar terms refer to an assembly, component or portion of a modified chip spreader or a component of the chip sealing train that is in the direction opposite the chip spreading direction with respect to a reference point, assembly, component or portion of the modified chip spreader or component of the chip sealing train.

The terms "rear end" and similar terms, when used with respect to a chip sealing train or a vehicular component of a chip sealing train, refer to a relative location or direction towards the trailing end of the chip sealing train or the component thereof as it travels in the chip spreading direction.

SUMMARY OF THE INVENTION

The invention comprises a modified chip spreader that is adapted to be used in a chip sealing train including a chip supply dump truck and an asphalt composition supply truck. The modified chip spreader is a self-propelled vehicle that has a receiving hopper on its front end, a spreader assembly on its rear end and a conveyor assembly for conveying stone chips from the receiving hopper to the spreader assembly. The modified chip spreader also includes a spray assembly that is in fluid communication with an outlet line from the asphalt composition supply truck, which spray assembly is adapted to dispense an asphalt composition onto the surface of a roadway in front of the spreader assembly.

Preferably, the modified chip spreader also has a pump that is adapted to pump the asphalt composition from the asphalt composition supply truck to the spray assembly. It is also preferred that the modified chip spreader have a tow bar on its rear end that is operatively attached to a tow-bar hitch assembly on the front end of the asphalt composition supply truck, and a hitch assembly on its front end for coupling it to rear end of the chip supply dump truck.

When the chip supply dump truck and the asphalt composition supply truck are operatively attached to the preferred modified chip spreader, and the dump bed of the chip supply truck is raised, stone chips will fall into the receiving hopper of the modified chip spreader. As the preferred modified chip spreader is driven along the roadway in the chip spreading direction, pushing the chip supply dump truck and pulling the asphalt composition supply truck, the conveyor assembly is operated to convey stone chips to the spreader assembly, and the asphalt composition pump is operated to pump asphalt composition from the asphalt composition supply truck to the spray assembly. The spray assembly will dispense asphalt composition on the roadway in front of the spreader assembly, and the spreader assembly will dispense stone chips onto the newly applied asphalt composition across the roadway.

The invention also includes a method for carrying out a chip sealing operation using the modified chip spreader described herein.

In order to facilitate an understanding of the invention, the preferred embodiment of the invention, as well as the best mode known by the inventors for carrying out the invention, are illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENT OF THE INVENTION

Figure 1:
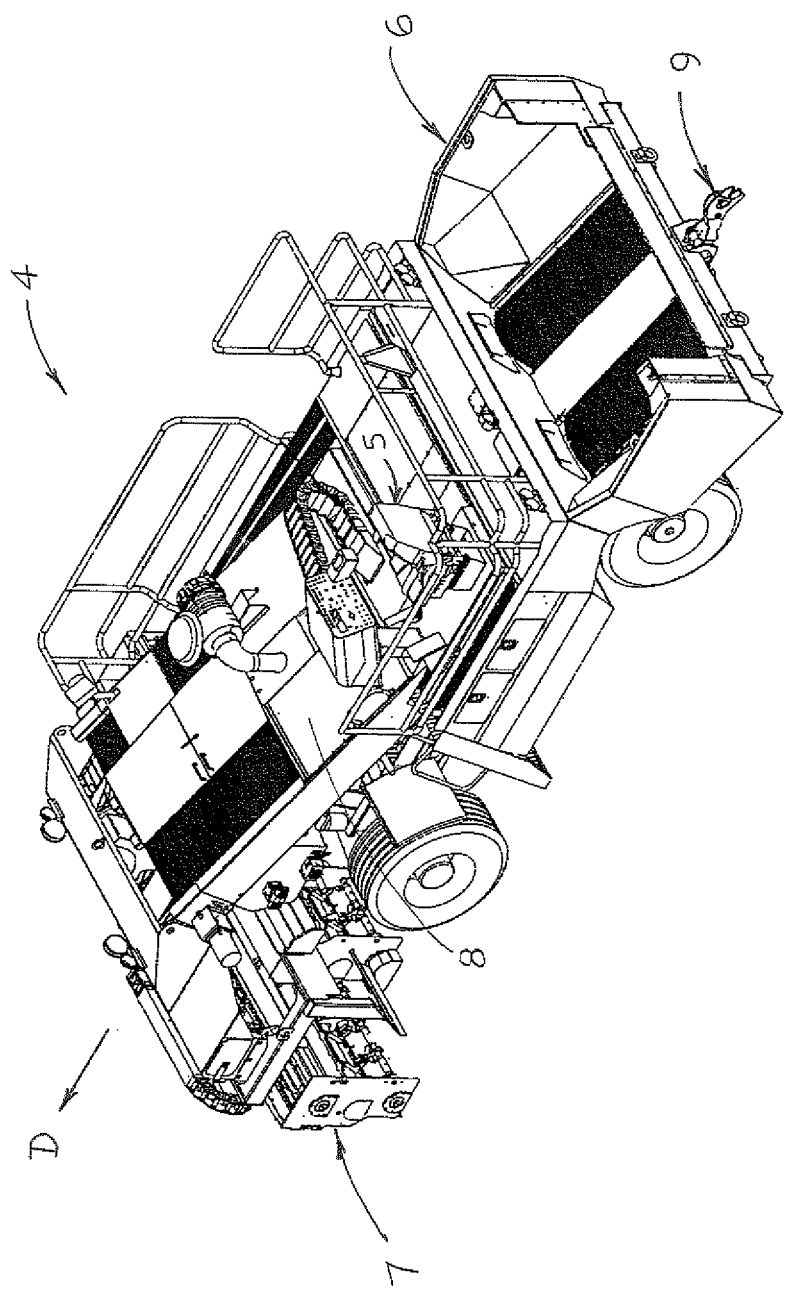
FIG. 1 is a perspective view of a conventional chip spreader.

This description of a preferred embodiment of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Conventional chip spreader 4 is a self-propelled vehicle that is adapted to be driven in direction "D" by an operator who is seated at operator's station 5. Chip spreader 4 is adapted to follow a conventional asphalt composition supply truck (not shown) which is dispensing asphalt composition from a spray assembly located at its rear end. Chip spreader 4 has receiving hopper 6 on its rear end and spreader assembly 7 on its front end. Receiving hopper 6 is adapted to receive chips from a chip supply dump truck, and conveyor assembly 8 is adapted to convey these chips from receiving hopper 6 to spreader assembly 7, which disperses the chips across the roadway. Hitch assembly 9 is located on the rear end of chip spreader 4 for coupling the chip spreader to the rear end of a chip supply dump truck. Since the receiving hopper can only accommodate a portion of the load of the chip supply truck, the dump bed of the supply truck is raised and the chip spreader is coupled to the supply truck for a period of time sufficient to unload the chips from the dump truck as chip spreader 4 travels in direction D pulling the dump truck backwards, and as chips are conveyed from the receiving hopper to the chip spreader assembly on the front end of this conventional chip spreader.

Figure 2:
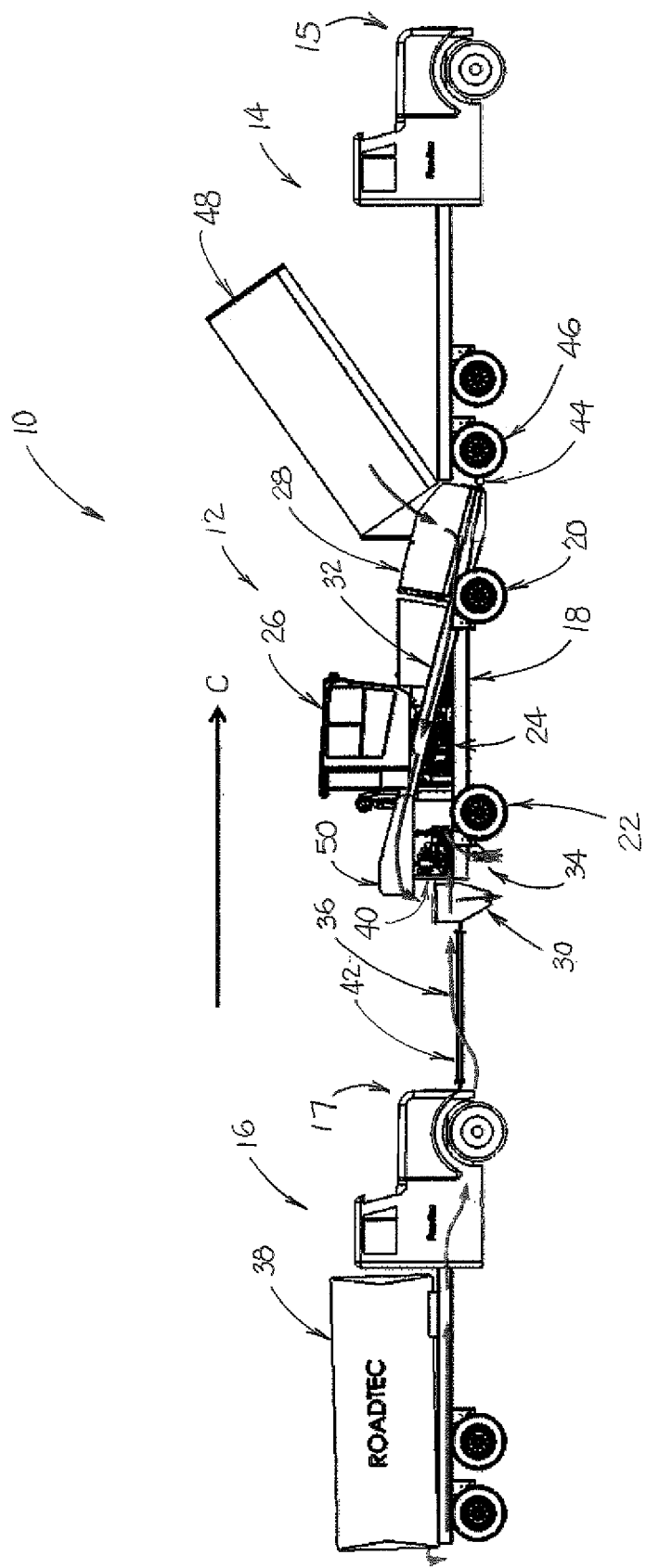
FIG. 2 is a side view of a chip sealing train according to a preferred embodiment of the invention.
Figure 3:
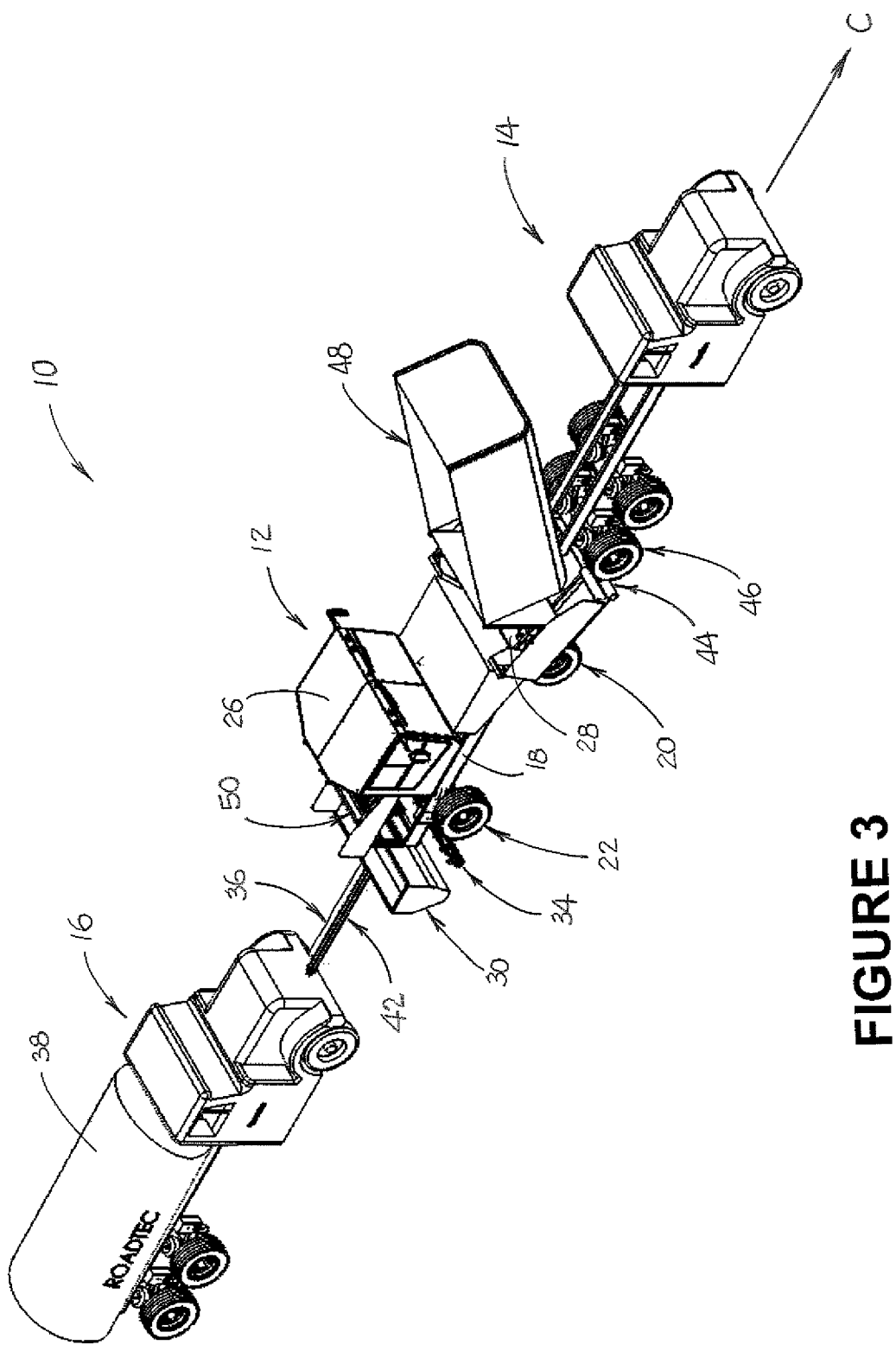
FIG. 3 is a perspective view of the chip sealing train illustrated in FIG. 2.

As shown in FIGS. 2 and 3, preferred chip sealing train 10 includes three components, modified chip spreader 12, chip supply dump truck 14 and asphalt composition supply truck 16. Modified chip spreader 12 is a self-propelled vehicle having frame 18 that is supported by front wheel assembly 20 and rear wheel assembly 22. The wheel assemblies are operatively connected to an engine 24 that is located beneath operator's station 26. Suitable controls and controllers are provided in the operator's station to operate all of the components of modified chip spreader 12 and to drive it in chip spreading direction "C" by an operator who is facing forward as the machine moves in the chip spreading direction. Modified chip spreader 12 also has receiving hopper 28 on its front end, a spreader assembly including a spreader hopper 30 on its rear end, and conveyor assembly 32 for conveying stone chips from receiving hopper 28 to the spreader assembly. The modified chip spreader is also equipped with spray assembly 34 that is in fluid communication with outlet line 36 from supply tank 38 of asphalt composition supply truck 16. Preferably, modified chip spreader 12 includes pump 40 which is adapted to pump asphalt composition from supply tank 38 of asphalt composition supply truck 16 to spray assembly 34. In other embodiments of the invention (not shown), the pump may be located on asphalt composition supply truck 16. Spray assembly 34 is adapted to dispense an asphalt composition onto the surface of a roadway in front of the spreader assembly.

Although it is not essential that modified chip spreader 12 be operatively attached to chip supply dump truck 14 and to asphalt composition supply truck 16, such a configuration of the chip sealing train is preferred. Such a configuration will permit the operator of the modified chip spreader to easily control the rate of advance of the vehicular components of the chip sealing train as it carries out a chip sealing operation.

Chip supply dump truck 14 is a conventional dump truck having a front end 15 adjacent to which is an operator's cab. Chip supply dump truck 14 is adapted to haul stone chips and is preferably equipped with a conventional hitch coupler (not shown) for attachment to a hitch assembly (also not shown, but similar to hitch assembly 9 on chip spreader 4) on the front end of modified chip spreader 12. Asphalt composition supply truck 16 is a conventional tanker truck having a front end 17 adjacent to which is an operator's cab. Asphalt composition supply truck 16 is adapted to haul liquid binder compositions including asphalt cement that are used in a chip sealing process.

Preferably, modified chip spreader 12 is equipped with tow bar 42 on its rear end that is attached to a tow-bar hitch assembly on front end 17 of asphalt composition supply truck 16. It is also preferred that modified chip spreader 12 be equipped with a roller assembly 44 on its front end (similar to those found on asphalt paving machines) that can be engaged by rear wheel assembly 46 located of chip supply truck 14 as dump bed 48 is raised to discharge stone chips into receiving hopper 28. As chip supply truck 14 unloads stone chips into receiving hopper 28, conveyor assembly 32 will carry the stone chips upwardly and off upper end 50 of conveyor assembly 32 into spreader hopper 30 of the spreader assembly.

When the chip supply dump truck and the asphalt composition supply truck are operatively attached to the preferred modified chip spreader, and dump bed 48 of chip supply truck 14 is raised, stone chips will slide and/or fall into receiving hopper 28 of modified chip spreader 12. As the preferred modified chip spreader is driven along the roadway in the chip spreading direction, pushing the chip supply dump truck and pulling the asphalt composition supply truck, conveyor assembly 32 on the modified chip spreader is operated to convey stone chips from receiving hopper 28 to the spreader assembly, and asphalt composition pump 40 is operated to pump asphalt composition from supply tank 38 of the asphalt composition supply truck to spray assembly 34. The spray assembly will dispense asphalt composition on the roadway and the spreader assembly will dispense stone chips out of spreader hopper 30 onto the newly applied asphalt composition across the roadway.

Although this description contains many specifics, these should not be construed as limiting the scope of the invention but as merely providing an illustration of the presently preferred embodiments thereof, as well as the best mode contemplated by the inventors of carrying out the invention. The invention, as described and claimed herein, is susceptible to various modifications and adaptations as would be appreciated by those having ordinary skill in the art to which the invention relates.

What is claimed is:

1. A chip sealing train for use in carrying out a chip sealing operation on a roadway, said chip sealing train comprising:
   a) a chip supply dump truck having a front end and a rear end, and further comprising a dump bed that is adapted to carry stone chips, said dump bed being adapted to be raised so that stone chips carried therein will slide out of the dump bed;
   b) an asphalt composition supply truck that is adapted to carry an asphalt composition, said asphalt composition supply truck having a front end, a rear end, and an outlet line through which the asphalt composition may be discharged;
   c) a self-propelled modified chip spreader which:
      i. has a front end;
      ii. has a rear end;
      iii. is adapted to be driven along the roadway with the front end leading in a chip spreading direction;
      iv. includes a receiving hopper on the front end for receiving the stone chips from the raised dump bed of the chip supply dump truck;
      v. includes a spreader assembly comprising a spreader hopper on the rear end, which spreader assembly is adapted to dispense the stone chips through the spreader hopper onto the roadway;
      vi. includes a conveyor assembly for conveying the stone chips from the receiving hopper to the spreader assembly;
      vii. includes a spray assembly that is in fluid communication with the outlet line of the asphalt composition supply truck and is adapted to dispense the asphalt composition received from the asphalt composition supply truck onto the surface of the roadway in front of the spreader assembly.

2. The chip sealing train of claim 1 wherein:
   a) the asphalt composition supply truck includes a supply tank which contains the asphalt composition and which is in fluid communication with the outlet line through which the asphalt composition may be discharged;
   b) the modified chip spreader includes a pump which is adapted to pump the asphalt composition from the supply tank of the asphalt composition supply truck to the spray assembly.

3. The chip sealing train of claim 1 wherein the front end of the asphalt composition supply truck is adapted to be operatively attached to the rear end of the modified chip spreader.

4. The chip sealing train of claim 1 wherein the front end of the modified chip spreader is adapted to be operatively attached to the rear end of the chip supply dump truck.

5. The chip sealing train of claim 1 wherein:
   a) the chip supply dump truck includes a rear wheel assembly;
   b) the modified chip spreader includes a roller assembly on the front end that is adapted to be engaged by the rear wheel assembly of the chip supply dump truck.

6. A self-propelled modified chip spreader that is adapted to cooperate with:
   a) a chip supply dump truck having a front end, a rear end, a rear wheel assembly and a dump bed that is adapted to carry stone chips and to be raised so that the stone chips carried therein will slide out of the dump bed; and
   b) an asphalt composition supply truck having a front end and a rear end, which asphalt composition supply truck is adapted to carry an asphalt composition and has an outlet line through which the asphalt composition may be supplied to the self-propelled modified chip spreader, in a chip sealing operation that may be carried out on a roadway, said self-propelled modified chip spreader:
   c) including a front end configured to removably engage the rear end of the chip supply dump truck;
   d) including a rear end configured to removably engage the front end of the asphalt composition supply truck;
   e) being adapted to be driven along the roadway with the front end leading in a chip spreading direction and to simultaneously push the chip supply dump truck and pull the asphalt composition supply truck;
   f) including a receiving hopper on the front end for receiving the stone chips from the raised dump bed of the chip supply dump truck;
   g) including a spreader assembly on the rear end which is adapted to dispense the stone chips onto the roadway;
   h) including a conveyor assembly for conveying the stone chips from the receiving hopper to the spreader assembly;
   i) including a spray assembly that is supplied with asphalt composition from the outlet line of the asphalt composition supply truck and is adapted to dispense the asphalt composition received from the asphalt composition supply truck onto the surface of the roadway in front of the spreader assembly.

7. The self-propelled modified chip spreader of claim 6 which includes a pump that is adapted to pump the asphalt composition from the asphalt composition supply truck to the spray assembly.

8. The self-propelled modified chip spreader of claim 6 which is adapted to be operatively attached at the rear end to the front end of the asphalt composition supply truck.

9. The self-propelled modified chip spreader of claim 6 which is adapted to be operatively attached at the front end to the rear end of the chip supply dump truck.

10. The self-propelled modified chip spreader of claim 6 which includes a roller assembly on the front end that is adapted to be engaged by the rear wheel assembly of the chip supply dump truck.

11. A method for carrying out a chip sealing operation on a roadway, said method comprising:
    a) providing a chip supply dump truck having a front end, a rear end, and a dump bed that is adapted to carry stone chips, said dump bed being adapted to be raised so that stone chips carried therein will slide out of the dump bed;
    b) providing an asphalt composition supply truck that is adapted to carry an asphalt composition, said asphalt composition supply truck having a front end, a rear end, and an outlet line through which the asphalt composition may be discharged;
    c) providing a self-propelled modified chip spreader which:
       i. has a front end;
       ii. has a rear end;
       iii. is adapted to be driven along the roadway with the front end leading in a chip spreading direction;
       iv. includes a receiving hopper on the front end for receiving the stone chips from the raised dump bed of the chip supply dump truck;

v. includes a spreader assembly on the rear end which is adapted to dispense the stone chips onto the roadway;

vi. includes a conveyor assembly for conveying the stone chips from the receiving hopper to the spreader assembly;

vii. includes a spray assembly that is in fluid communication with the outlet line of the asphalt composition supply truck and is adapted to dispense the asphalt composition received from the asphalt composition supply truck onto the surface of the roadway in front of the spreader assembly;

d) removably engaging the front end of the chip spreader with the rear end of the chip supply dump truck;

e) removably engaging rear end of the chip spreader with the front end of the asphalt composition supply truck;

f) driving the self-propelled modified chip spreader along the roadway in the chip spreading direction while:

i. simultaneously pushing the chip supply dump truck and pulling the asphalt composition supply truck with the chip spreader;

ii. raising the dump bed of the chip supply truck so that stone chips carried therein will slide out of the dump bed into the receiving hopper of the self-propelled modified chip spreader;

iii. discharging the asphalt composition through the outlet line of the asphalt composition supply truck into the spray assembly of the self-propelled modified chip spreader;

iv. operating the spray assembly of the self-propelled modified chip spreader to dispense the asphalt composition from the asphalt composition supply truck onto the surface of the roadway in front of the spreader assembly;

v. operating the conveyor assembly to convey the stone chips from the receiving hopper to the spreader assembly;

vi. operating the spreader assembly to dispense the stone chips onto the roadway.

12. The method of claim 11 which includes:

a) operatively attaching the rear end of the self-propelled modified chip spreader to the front end of the asphalt composition supply truck;

b) operatively attaching the front end of the self-propelled modified chip spreader to the rear end of the chip supply dump truck;

c) driving the self-propelled modified chip spreader along the roadway in the chip spreading direction, pushing the chip supply dump truck and pulling the asphalt composition supply truck.

* * * * *